(12) United States Patent
Abe

(10) Patent No.: US 6,477,241 B1
(45) Date of Patent: Nov. 5, 2002

(54) SOUND RECORDING CONTROLLER FOR DEALING SPEAKING SYSTEM

(75) Inventor: Isamu Abe, Koriyama (JP)

(73) Assignee: Hitachi Telecom Technologies, Ltd., Koriyama (JP)

(*) Notice: Subject to any disclaimer, the term of this patent is extended or adjusted under 35 U.S.C. 154(b) by 0 days.

(21) Appl. No.: 09/284,969

(22) PCT Filed: Sep. 17, 1997

(86) PCT No.: PCT/JP97/03286
§ 371 (c)(1),
(2), (4) Date: Jul. 15, 1999

(87) PCT Pub. No.: WO99/14927
PCT Pub. Date: Mar. 25, 1999

(30) Foreign Application Priority Data

Sep. 16, 1997 (JP) .............................................. 9-268239

(51) Int. Cl.[7] .............................................. H04M 1/64
(52) U.S. Cl. .......................... 379/88.25; 379/85; 379/87
(58) Field of Search .............................. 379/67.1, 88.25, 379/88.22, 84, 68

(56) References Cited

U.S. PATENT DOCUMENTS

| | | | |
|---|---|---|---|
| 5,535,262 A | * 7/1996 | Kanzawa et al. | 379/67 |
| 5,568,540 A | * 10/1996 | Greco et al. | 379/89 |
| 5,586,172 A | * 12/1996 | Sakurai et al. | 379/67 |
| 5,852,652 A | * 12/1998 | Matsuoka | 379/88 |
| 6,044,136 A | * 3/2000 | Takahashi et al. | 379/93.23 |

* cited by examiner

Primary Examiner—Fan Tsang
Assistant Examiner—Simon Sing
(74) Attorney, Agent, or Firm—Foley & Lardner

(57) ABSTRACT

The invention relates to a recording control apparatus in a dealing talk system, and aims at making it possible for a dealer to easily listen to a talk content recorded in a talk recording unit 1-29, and the invention is provided with a line control unit 1-2 to accommodate a digital line circuit 1-3 and a trunk 1-15, a talk terminal unit 1-1 connected with the digital line circuit 1-3, a talk recording unit 1-29 which is connected with the trunk 1-15 and records a talk content, an information processing unit 3-29 for managing talking control information from the talk terminal unit 1-1, and a network server 1-30 which controls the talk recording unit 1-29 on the basis of the talking control information from the information processing unit 3-29 and provides a talk voice recorded in the talk recording unit 1-29 through a telephone line to the talk terminal unit 1-1.

5 Claims, 11 Drawing Sheets

SOUND RECORDING CONTROLLER FOR DEALING SPEAKING SYSTEM

TECHNICAL FIELD

The present invention relates to a recording control apparatus in a dealing talk system used at the time of performing a financial transaction in a financial institute such as a bank, a securities company and the like.

BACKGROUND TECHNOLOGY

FIG. 11 is a block diagram roughly showing the composition of a recording control apparatus in a conventional dealing talk system.

As shown in FIG. 11, a recording control apparatus in a dealing talk system has a dealing talk terminal unit (DB) 11, an analog office line 12, a line control unit (LCU) 13 for controlling connection of the dealing talk terminal unit 11 and the analog office line 12, and a talk recording unit 15 which is connected through a recording dedicated line 14 to the dealing talk terminal unit 11 and records a talk content of the dealing talk terminal unit 11.

Said line control unit (LCU) 13 has a digital line circuit (DBDLIN) 16 for controlling connection of the dealing talk terminal unit 11, a central office line trunk (COT) 17 to be connected with an analog office line 12, and a speech path switch (TSW) 18 for switching and connecting these digital line circuits 16 and central office trunk 17.

Now, when a dealer is kept in a talking state by an originating call or incoming call through a general switching line such as an analog office line 12, a talk recording unit 15 connected with the dealing talk terminal unit 11 is always in a recording state, or starts or stops recording a talk by detecting the talking voice to record the content of the talk.

Moreover, in order that a dealer may listen to a recorded content, the dealer has to move to a place where the talk recording unit 15 is installed and listen to a desired content by manual operation.

As described above, up to now, in order that a dealer may listen to a recorded content, the dealer needs to move to a place where the talk recording unit 15 is installed and operate it. Due to this, there is a disadvantage that it takes a long time for a dealer to move to a place where a talk recording unit 15 is installed and the working efficiency of the dealer is degraded since the dealer cannot work at its dealing talk terminal unit 11 at the time of listening to a recorded content.

The present invention has been performed in order to solve such an existing problem, and an object of the invention is to provide a recording control apparatus in a dealing talk system, said recording control apparatus making it possible for a dealer to listen to a content recorded in a talk recording unit.

DISCLOSURE OF THE INVENTION

A recording control apparatus in a dealing talk system according to claim 1 of the present invention is provided with a line control unit for accommodating and connecting a plurality of trunk circuits and a plurality of line circuits to be connected to telephone lines, a dealing talk terminal unit connected with a line circuit, a talk recording unit which is connected with a trunk circuit and records a talk content of a dealing talk terminal unit, an information processing unit for managing talking control information from a dealing talk terminal unit, and a network server which controls the talk recording unit on the basis of the talking control information from the information processing unit and provides a talk content recorded in this talk recording unit through a telephone line to a dealing talk terminal.

Accordingly, since a recording control apparatus in a dealing talk system as defined in claim 1 of the invention allows a dealer having a dealing talk terminal unit at its own seat to remote operate a talk recording unit from its dealing talk terminal unit as it is at its own seat without moving to a place where the talk recording unit is installed and to listen to a talk content recorded in the talk recording unit at the dealing talk terminal side according to this remote operation, it can greatly improve the working efficiency of a dealer at the time of listening to a content recorded in this talk recording unit.

And a recording control apparatus in a dealing talk system according to claim 2 of the invention is a recording control apparatus in a dealing talk system as defined in claim 1 in which said talk recording unit has a channel for recording a talk content, said channel corresponding to a dealing talk terminal unit accommodated by a line control unit in a one-to-one correspondence, and said network server controls the talk recording unit on the basis of talking control information containing channel information from said information processing unit, selects a channel in said talk recording unit on the basis of the channel information contained in this talking control information, and provides a talk content recorded in this channel through a telephone line to the dealing talk terminal unit.

Accordingly, since a recording control apparatus in a dealing talk system as defined in claim 2 of the invention provides a channel corresponding to each dealing talk terminal unit in a one-to-one correspondence and recording its talk content and makes talking control information contain channel information for identifying each channel of this talk recording unit, in addition to the effect of the recording control apparatus according to claim 1, it makes it possible for a dealer to listen to a talk content of each dealing talk terminal unit by remote operation.

BEST EMBODIMENT FOR IMPLEMENTING THE INVENTION

An embodiment of the present invention is described in detail with reference to the drawings in the following.

Figure 1:
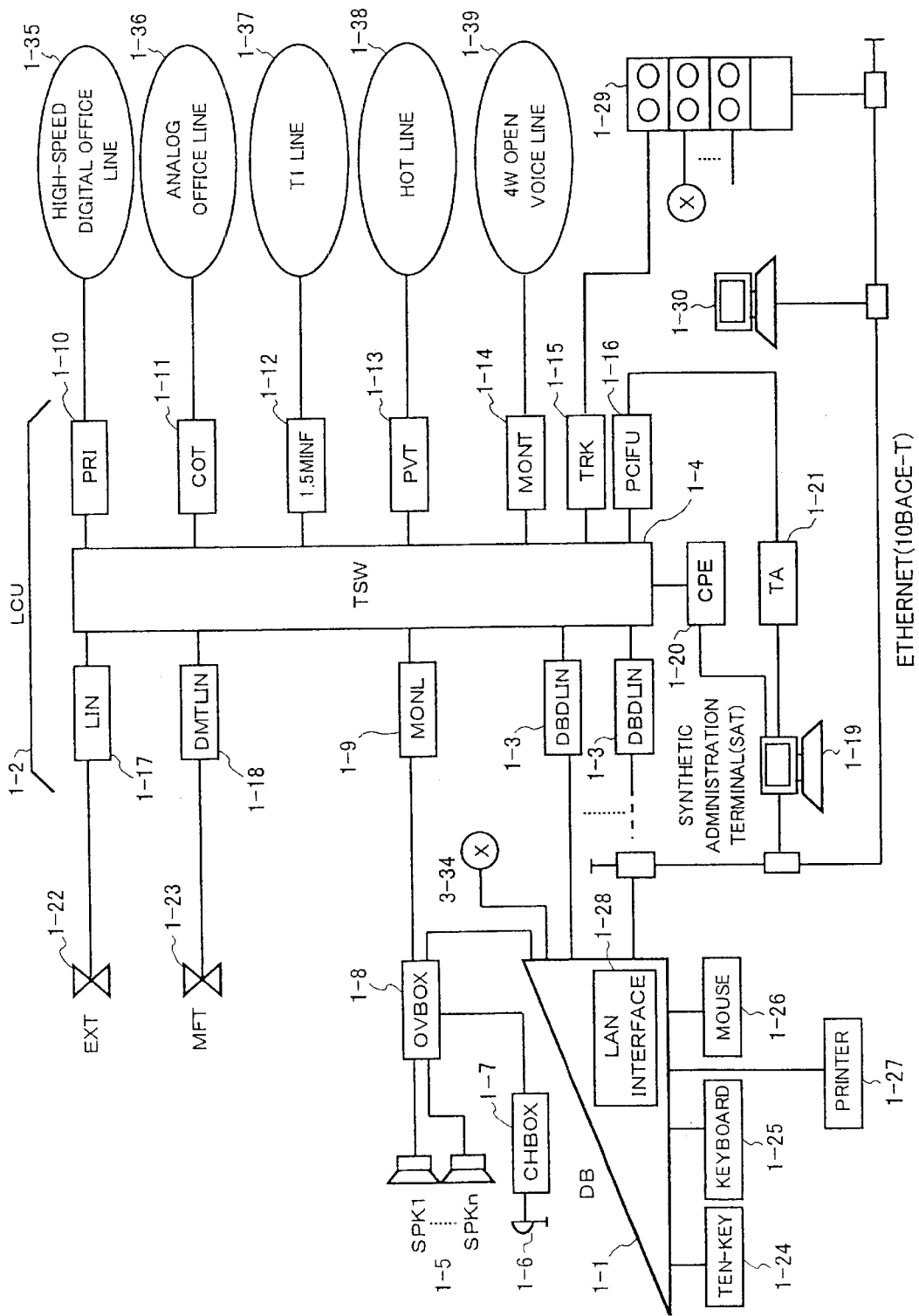
FIG. 1 is a block diagram roughly showing the composition of a recording control apparatus in a dealing talk system according to the present invention.

FIG. 1 is a block diagram roughly showing the composition of a recording control apparatus in a dealing talk system of the present invention, and shows a case where this is applied to a dealing talk system formed into a network by means of a local area network (LAN).

In FIG. 1, a plurality of dealing talk terminal units (DB; hereinafter referred to as simply talk terminal units) 1-1 are accommodated by a line control unit (LCU) 1-2 for switching and connecting calls. That is to say, the line control unit 1-2 is provided with a speech path switch (TSW) 1-4 for freely connecting a call, and a talk terminal unit 1-1 is connected with a digital talk terminal unit line circuit (DBDLIN; hereinafter referred to as simply a digital line circuit) 1-3 accommodated by this speech path switch 1-4.

Connection between a digital line circuit 1-3 and a talk terminal unit 1-1 is performed by an I interface which is a digital line interface, and the digital line circuit 1-3 is connected at an S point of the I interface. And channels B1 and B2 of the I interface are used as speech channels and the said channels B1 and B2 are logically connected with the speech path switch 1-4.

As open voice devices for sending voice information related to transactions, this embodiment is provided with a plurality of monitor speakers (1 to n) 1-5, a speech sending microphone 1-6 which is a speech sending means, a speech sending changeover box (CHBOX) 1-7 connected with the speech sending microphone 1-6, and an open voice box (OVBOX) 1-8 connected with the speech sending changeover box 1-7 as well as each monitor speaker 1-5. Such open voice devices are connected with a talk terminal unit 1-1 needing to accommodate an open voice line according to work.

And the open voice box 1-8 provided correspondingly to the plurality of speakers 1-5 is connected with a four-wire monitor line circuit (MONL) 1-9 which is a line circuit dedicated to open voice, and the four-wire monitor line circuit 1-9 is accommodated by the speech switch 1-4.

And the speech path switch 1-4 accommodates a primary group interface (PRI) 1-10 for forming an interface with a high-speed digital office line 1-35, a central office line trunk (COT) 1-11 for forming an interface with an analog office line 1-36, a 1.5-M interface trunk (1.5M INF) 1-12 for forming an interface with a Ti line 1-37 which is a 1.5-M digital private line, a private line trunk (PVT) 1-13 for forming an interface with a private line used as a hot line 1-38, a four-wire monitor trunk (MONT) 1-14 for forming an interface with a private line used as a four-wire (4W) open voice line 1-39, and a trunk (TRK) 1-15 for forming an interface with a talk recording unit 1-29. The speech path switch 1-4 can be also connected with the talk recording unit 1-29 through a plurality of circuits by being provided with the plurality of trunks 1-15.

Additionally, the speech path switch 1-4 accommodates a PC interface trunk (PCIFU) 1-16 in addition to the line interfaces, and is connected by an S point interface through a terminal adapter (TA) 1-21 with a synthetic administration terminal unit (SAT) 1-19.

The synthetic administration terminal unit 1-19 is a processing device which is connected with a central processing equipment (CPE) 1-20 for controlling the whole line control unit (LCU) 1-2 and which administrates the whole dealing talk system.

And this system can accommodate a general telephone (EXT) 1-22 and a multifunctional telephone (MFT) 1-23 in addition to the talking terminal-unit (DB) 1-1 as a talk terminal unit, and the general telephone (EXT) 1-22 is connected through a line circuit (LIN) 1-17 with the speech path switch (TSW) 1-4. And the multifunctional telephone (MFT) 1-23 is connected through a digital multifunctional telephone line circuit (DMTLIN) 1-18 with the speech path switch 1-4.

The talk terminal unit 1-1 is provided with an interface portion for externally connecting a ten-key pad 1-24, a keyboard 1-25, a mouse 1-26, and a printer 1-27.

The ten-key pad 1-24 and the mouse 1-26 are used for performing various selecting operations such as a dial input operation and the like on a line display screen (telephone function display screen) being displayed in a display device (pagination key) of the talk terminal unit 1-1 as described later.

And it is possible also to use the talk terminal unit 1-1 as a personal computer by externally connecting a keyboard with it. And it is possible also to connect a printer 1-27 in the same way as a keyboard.

Moreover, the talk terminal unit 1-1 is provided with an LAN interface 1-28 and is connected to a LAN with Ethernet (10BASE-T or 10BASE2) and can access a network server 1-30 for managing and controlling a talk recording unit 1-29.

Furthermore, the talk terminal unit 1-1 is provided with a talk recording and outputting interface portion 3-34 for outputting a talk content, and can record every talk content or a talk content specified to be recorded according to a key operation by a talk recording key provided at the talk terminal unit 1-1 side into the talk recording unit 1-29 by being connected through the talk content recording and outputting interface portion 3-34 with the talk recording unit 1-29.

Although not illustrated, the line control unit 1-2 accommodates a plurality of talk terminal units 1-1, and each of these talk terminal units 1-1 is connected with a LAN and a talk recording unit 1-29.

And said talk recording unit 1-29 is provided with a recording area (recording channel) corresponding to each talk terminal unit 1-1 connected with this talk recording unit 1-29 in a one-to-one correspondence, and a recorded talk content indexed by its recording date and time for each of recording channels is managed.

Figure 2:
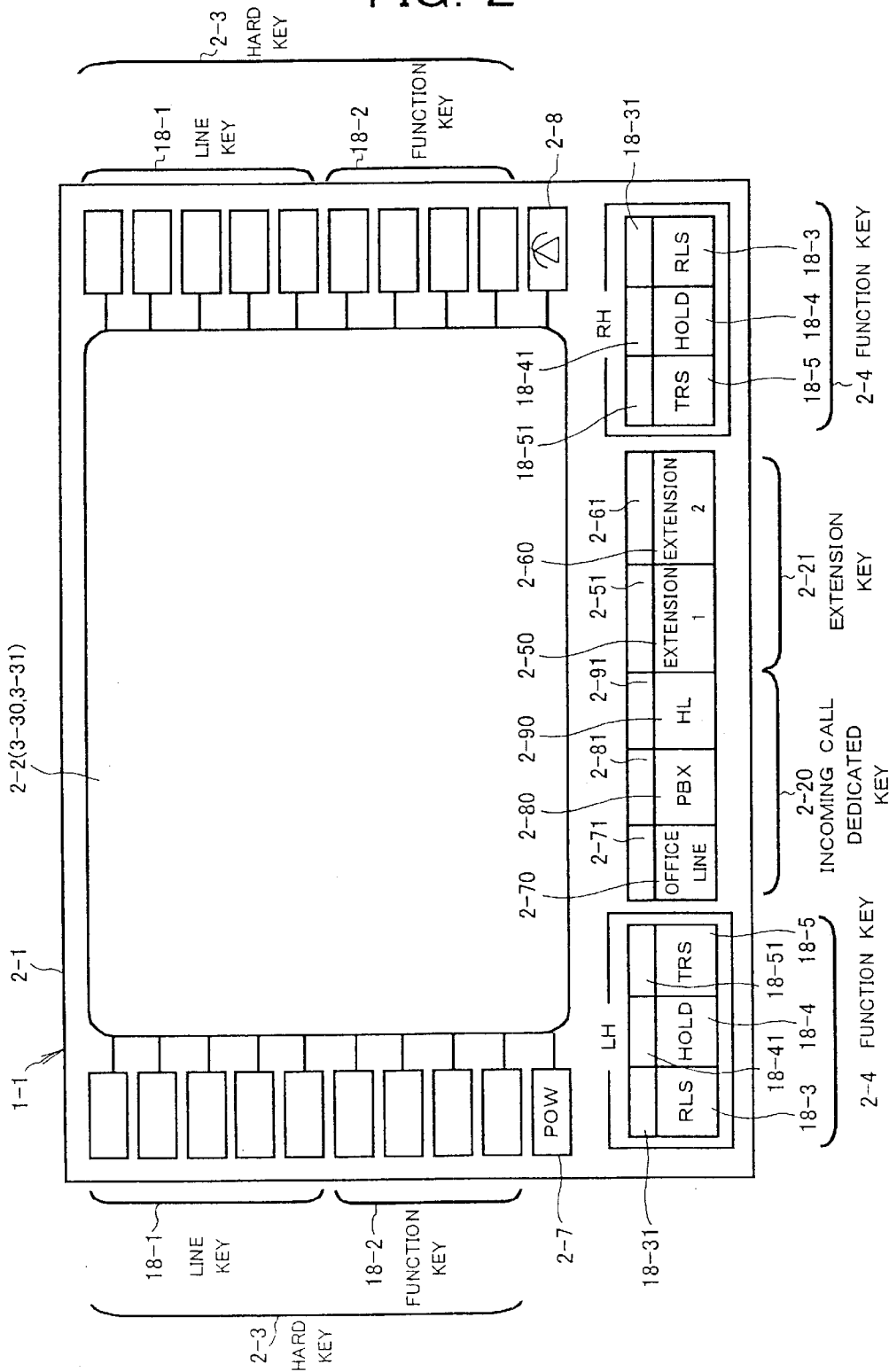
FIG. 2 is a panel view of a dealing talk terminal unit shown in the present embodiment.

FIG. 2 is a panel view showing the panel of a talk terminal unit 1-1.

In FIG. 2, a pagination key 2-2 having a color display 3-30 and a pressure-sensitive touch panel 3-31 combined with each other is arranged in the middle of the panel of the cabinet 2-1 of the talk terminal unit 1-1.

Ten line keys 18-1 and eight function keys 18-2 as hard keys 2-3 which can operate being interlocked with a series of keys at each of the left and right sides of the pagination key 2-2 are arranged at each of the left and right sides of the panel, being adjacent to this pagination key 2-2.

And at the bottom of the panel, "RLS" keys 18-3 to be pressed to terminate a call, "HOLD" keys 18-4 to be pressed to hold a line during conversation and "TRS" keys 18-5 to be pressed to transfer a line being used to another talk terminal unit or another telephone are arranged as function keys 2-4 corresponding to the left and right handsets.

And an "Extension 1" key 2-50 and an "Extension 2" key 2-60 as extension keys 2-21 for performing an extension call origination or an incoming call answer, an "Office line" key 2-70 which is a key for concentrically performing an incoming call answer and is used as a centralized incoming call display answering key 2-20 (dedicated to incoming calls), a "PBX line" key 2-80, and a "Hot line" key 2-90 are arranged in the middle of the bottom of the panel.

Furthermore, a "POW" key 2-7 for turning power on/off by software and a "Telephone screen return" key 2-8 for switching over by one touch a display screen of using a personal computer function to a line display screen are, respectively, arranged at the left and the right side of the bottom of the panel.

Said "RLS" keys 18-3, "HOLD" keys 18-4 and "TRS" keys 18-5 are, respectively, provided with light emitting diodes (LEDs) 18-31, 18-41 and 18-51 for showing their states which are arranged above and adjacently to them. And in the same way, said "Extension 1" key 2-50, "Extension 2" key 2-60, "Office line" key 2-70, "PBX line" key 2-80, and "Hot line" key 2-90 also are provided, respectively, with light emitting diodes (LEDs) 2-51, 2-61, 2-71, 2-81 and 2-91 for showing their states.

Figure 3:
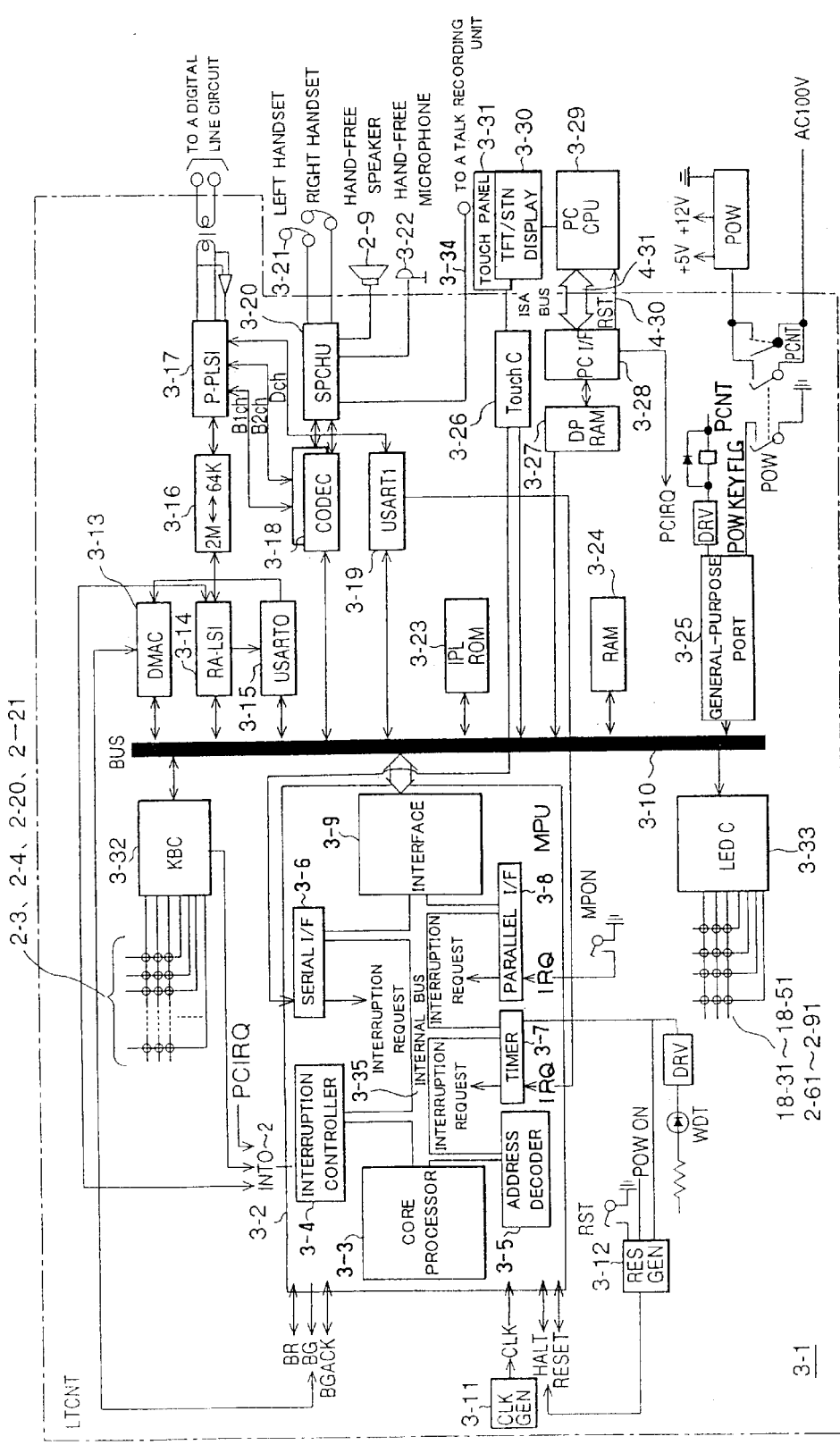
FIG. 3 is a block diagram showing an internal composition of a line trunk controller (LTCNT) in a dealing talk terminal unit shown in this embodiment.

Now, a slave controller (line trunk controller; (LTCNT) being inside said talk terminal unit 1-1 is described. FIG. 3 is a block diagram roughly showing an internal composition of an line trunk controller being inside said talk terminal unit 1-1.

In FIG. 3, a line trunk controller (LTCNT) 3-1 mounted inside the talk terminal unit 1-1 is a slave controller which is connected with a digital line circuit 1-3 of the line control unit 1-2 and performs an originating/incoming call line control.

A microprocessor (MPU) 3-2 for controlling the whole line trunk controller 3-1 is composed of a core processor 3-3, an interruption controller 3-4, an address decoder 3-5, a serial interface 3-6, a timer 3-7, a parallel interface 3-8 and a bus interface 3-9, and they are connected with one another through an internal bus 3-35.

And the microprocessor 3-2 is connected with a reset signal generating circuit (RESGEN) 3-12 and a clock generating circuit (CLKGEN) 3-11, and is operated according to signals from these reset signal generating circuit 3-12 and clock generating circuit 3-11.

A bus 3-10 is connected with the microprocessor 3-2, a keyboard controller (KBC) 3-32 for controlling every key provided on the panel of the talk terminal unit 1-1, as shown in FIG. 2 for example, hard keys 2-3, function keys 2-4, a telephone screen return key 2-8, a POW key 2-7, incoming call dedicated keys 2-20 and extension keys 2-21 (keys represented by symbols 2-50, 2-60, 2-70, 2-80, 2-90, 18-1, 18-2, 18-3, 18-4, 18-5 and the like in FIG. 2), an LED controller (LEDC) 3-33 for performing a display control of every LED corresponding to those hard keys (LEDs represented by symbols 18-31, 18-41, 18-51, 2-51, 2-61, 2-71, 2-81 and 2-91 in FIG. 2), an IPL ROM 3-23 having an IPL program stored in it, a working RAM 3-24 having an online program stored in it, a general use port 3-25 for performing a read/write operation for a hard point, a direct memory access controller (DMAC) 3-13 used in a control operation at the time of downloading or uploading a talk terminal unit program, office data and the like, a transmission rate adaption (RA-LSI) 3-14, a serial communication receiver/transceiver (USART0) 3-15, a codec (CODEC) 3-18, a serial communication receiver/transceiver (USART1) 3-19 used in a D-channel communication with the line control unit 1-2, and a touch panel controller (Touch C) 3-26 for controlling a touch panel.

Connection of the line trunk controller 3-1 with the digital line circuit 1-3 is interfaced by a data transmission LSI (P-PLSI) 3-17 in the I interface. This data transmission LSI (P-PLSI) 3-17 divides the digital line circuit 1-3 into channels B1 and B2 and channel D, and said channel D is connected with the serial communication receiver/transceiver (USART1) 3-19 and sends and receives control information to and from the microprocessor 3-2 through the serial communication receiver/transceiver 3-19.

Thus, when the touch panel 3-31 is operated and a call connection, a call holding, a call releasing and the like are requested, the microprocessor 3-2 of the line trunk controller 3-1 can transmit call control information based on the request through the channel D to the digital line circuit 1-3 of the line control unit 1-2, and can receive incoming call information from the digital line circuit 1-3 through channel D.

And the channels B1 and B2 divided by the data transmission LSI 3-17 are connected with the codec 3-18. This codec 3-18 converts a voice signal from an analog signal to a digital signal and from a digital signal to an analog signal, and transmits the voice signal to a speech path control unit (SPCH U) 3-20. That is to say, the data transmission LSI 3-17 sends and receives a voice signal to and from the speech path control unit 3-20 through the codec 3-18.

The speech path control unit 3-20 has the left and right handsets 3-21, a hand-free speaker 2-9 and a hand-free microphone connected with it, and enables a handset talking and a hand-free talking. The hand-free speaker 2-9 functions also as an incoming ringer speaker.

In case that the synthetic administration terminal unit 1-19 downloads a control program for a talk terminal unit and office data to the talk terminal unit 1-1 through the PC interface trunk 1-16 of the line control unit 1-2 and the terminal adapter 1-21, the component with which the channel B2 divided by the data transmission LSI 3-17 is to be connected is switched over to the speed converter 3-16. This speed converter 3-16 converts B2 channel data of 64 Kbps into 2 Mbps, and transmits the converted B2 channel data of 2 Mbps to the rate adapting LSI (RA-LSI) 3-14.

This rate adapting LSI 3-14 converts the B2 channel data of 2 Mbps into 19.2 Mbps and transmits the converted B2 channel data of 19.2 Mbps to the serial communication receiver/transceiver (USART0) 3-15. This serial communication receiver/transceiver 3-15 converts the B2 channel data of 19.2 Mbps into a parallel signal and transmits the parallel-converted data to the direct memory access controller 3-13. This direct memory access controller 3-13 DMA-transfers said data through the bus 3-10 to a RAM 3-24.

And the talk terminal unit 1-1 has an information processing unit (PCCPU) 3-29 for performing control of the whole talk terminal unit, control of its display screen and management of office data. The information processing unit 3-29 and the line trunk controller 3-1 communicate various kinds of control information and data such as key operation information, display screen information and the like through a shared memory (DPRAM) 3-27 to each other. The shared memory 3-27 and the information processing unit 3-29 are connected with each other through an ISA bus 4-31 by means of a PC interface 3-28.

The pagination key 2-2 provided on the panel of the talk terminal unit 1-1 is composed of a TFT/STN display 3-30 and a touch panel 3-31. The TFT/STN display 3-30 is display-controlled by the information processing unit 3-29, and the touch panel 3-31 is controlled by a touch controller 3-26.

Figure 4:
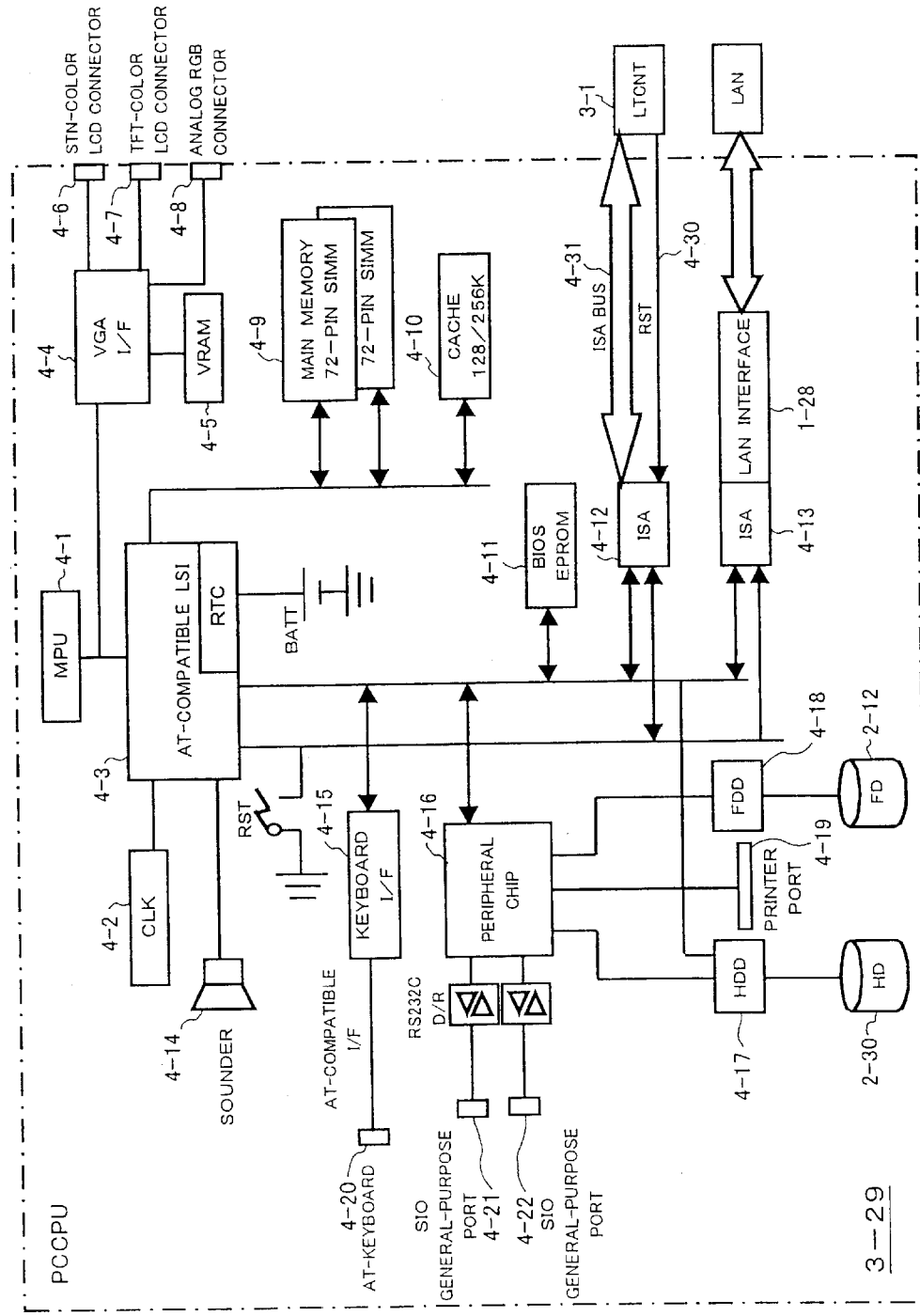
FIG. 4 is a block diagram showing an internal composition of an information processing unit (PCCPU) in a dealing talk terminal unit shown in this embodiment.

Then, the information processing unit 3-29 is described. FIG. 4 is a block diagram roughly showing an internal composition of the information processing unit 3-29 being inside the said talk terminal unit 1-1.

In FIG. 4, the information processing unit 3-29 mounted inside the talk terminal unit 1-1 is a personal computer board (mother board) for providing a personal computer function compatible with PC/AT to the talk terminal unit 1-1.

In FIG. 4, the information processing unit (PCCPU) 3-29 is composed of a microprocessor (MPU) 4-1, an AT-compatible LSI 4-3 for making its architecture compatible with PC/AT, a clock generating circuit (CLK) 4-2, a VGA interface (VGA I/F) 4-4 for controlling a display device, a VRAM 4-5, a main memory 4-9, a cache memory 4-10, a basic input/output system (BIOS) 4-11, an ISA connector 4-12 for being interconnected with the line trunk controller (LTCNT) 3-1, an ISA connector 4-13 for being interconnected with a LAN interface card, a sounder 4-14 for generating an alarm sound, a keyboard interface 4-15, a peripheral chip 4-16 and the like.

The VGA interface 4-4 is connected with a VL bus in order to enhance its display control capability and has three kinds of display output connectors, namely, an STN color LCD connector 4-6, a TFT color LCD connector 4-7 and an analog RGB connector 4-8, and any of these display outputs can be selected according to a display device.

Said main memory 4-9 adopts a 72-pin SIMM memory, and can have a maximum of 32 Mbytes with two 16-Mbyte boards mounted in it.

And the peripheral chip 4-16 is connected with a hard disk driver 4-17 for controlling a hard disk drive (HDD) 2-30, a floppy disk driver 4-18 for controlling a floppy disk drive (FDD) 2-12, a printer port 4-19, and two general-purpose ports 4-21 and 4-22 as serial ports. The serial ports 4-21 and 4-22 are used also as serial mouse connecting ports.

The keyboard interface 4-15 is provided with a connector 4-20 for connecting an AT keyboard.

Figure 5:
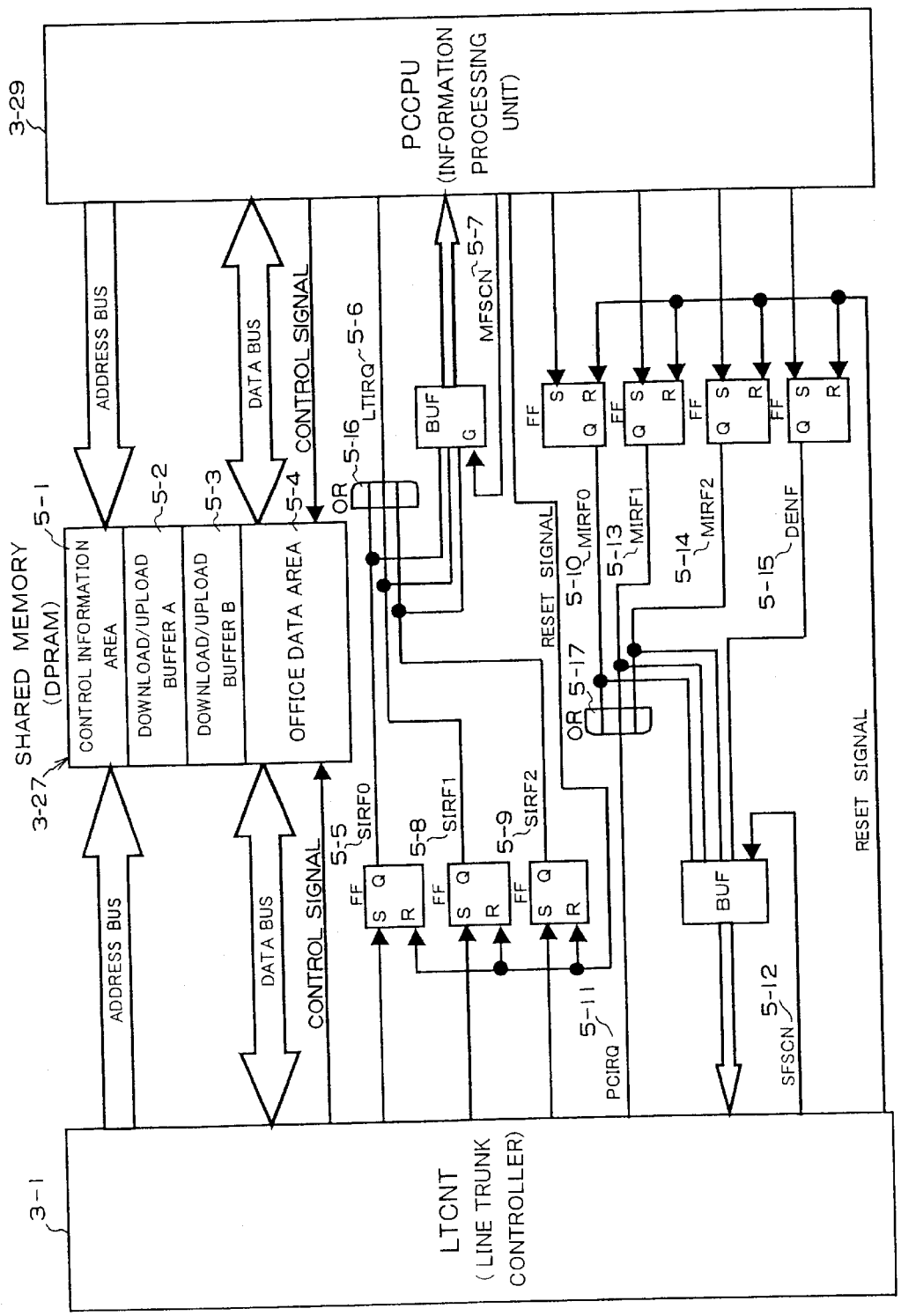
FIG. 5 is an explanatory diagram showing a method for accessing a shared memory between a line trunk controller and an information processing unit which are in a dealing talk terminal unit shown in this embodiment.

Next, a method for accessing the shared memory 3-27 between the line trunk controller (LTCNT) 3-1 and the information processing unit (PCCPU) 3-29 is described. FIG. 5 shows a shared memory accessing method at the time of accessing the shared memory 3-27 between the line trunk controller 3-1 and the information processing unit 3-29.

In FIG. 5, the shared memory (DP RAM) 3-27 has an input port composed of an address bus, a data bus and a control signal at each of the line trunk controller 3-1 side and the information processing unit 3-29 side, and can be accessed through these input ports from any of the line trunk controller 3-1 side and the information processing unit 3-29 side.

This shared memory (DPRAM) 3-27 has addresses which are allocated to a control information area 5-1, a download/upload buffer A 5-2, a download/upload buffer B 5-3, and an office data area 5-4.

The control information area 5-1 is an area which is used in transferring various interlocked control information such as the originating call or incoming call control information in case of originating or terminating a call, the function key operation information related to operation of the touch panel 3-31, the display screen information displayed on the TFT/STN display 3-30 and the like between the line trunk controller 3-1 and the information processing unit 3-29, and which can be accessed by any of the line trunk controller 3-1 and the information processing unit 3-29 to read/write it.

The download/upload buffer A 5-2 and the download/upload buffer B 5-3 are areas where the line trunk controller 3-1 writes in and the information processing unit 3-29 reads out in case of downloading and where the information processing unit 3-29 writes in and the line trunk controller 3-1 reads out in case of uploading.

The office data area 5-4 is an area which is used for the information processing unit 3-29 to notify the line trunk controller 3-1 of key data of a page currently displayed, and which is used as a write-only area by the information processing unit 3-29 and as a read-only area by the line trunk controller 3-1.

In a method for accessing the shared memory 3-27, the line trunk controller 3-1 writes data into the control information area 5-1 and sets SIRF0 5-5 in case of transmitting the data to the information processing unit 3-29. When the SIRF0 5-5 is set, an interruption is performed from LTIRQ 5-6 to the information processing unit 3-29 and an OR circuit 5-16 notifies the information processing unit 3-29 that a data transmission is performed.

The information processing unit 3-29 confirms an interruption flag through MFSCN 5-7, reads out data of the control information area 5-1 corresponding to SIRF0 5-5, and resets the SIRF0 5-5. The download/upload buffers A and B 5-2 and 5-3 also perform the same sequence of operations using SIRF1 5-8 and SIRF2 5-9.

On the other hand, in case of transmitting data such as display screen information and the like to the line trunk controller 3-1, the information processing unit 3-29 writes the data into the control information area 5-1 and sets MIRF0 5-10.

When the MIRF0 5-10 is set, an interruption is performed by PCIRQ 5-11 to the line trunk controller 3-1 and an OR circuit 5-17 notifies the line trunk controller 31 that a data transmission is performed.

The line trunk controller 3-1 confirms an interruption flag through SFSCN 5-12, reads out data of the control information area 5-1 corresponding to MIRF0 5-10, and resets the MIRF0 5-10. The download/upload buffers A and B 5-2 and 5-3 also perform the same sequence of operations using MIRF1 5-13 and MIRF2 5-14.

Since the office data area 5-4 is used only for the information processing unit 3-29 to notify the line trunk controller 3-1, without using interruption a data enable flag (DENF) 5-15 indicating that data is valid is set after the data is set. The line trunk controller 3-1 scans periodically the DENF 5-15 with SFSCN 5-12, and uses data when the data is valid.

And as shown in FIG. 3 or 4, a reset control line 4-30 for resetting the information processing unit 3-29 according to an input signal (reset signal) from the line trunk controller 3-1 is provided between the information processing unit 3-29 and the line trunk controller 3-1.

Usually, in a normal state, the information processing unit 3-29 and the line trunk controller 3-1 access periodically the shared memory 3-27, but for example, in case that the information processing unit 3-29 overruns and the line trunk controller 3-1 does not access the shared memory 3-27, the line trunk controller 3-1 judges that the information processing unit 3-29 is in an abnormal state, sends out a reset signal through the reset control line 4-30 to the information processing unit 3-29, and performs a control to urge the information processing unit 3-29 to restart.

In this way, it is possible to return the information processing unit 3-29 to a normal state by restarting automatically the information processing unit 3-29 when it is in an abnormal state.

The dealing talk system and the talk terminal unit 1-1 are composed in such a way as described above.

Next, a screen displaying operation and a processing operation related to talking control of the talk terminal unit 1-1 are described.

Figure 6:
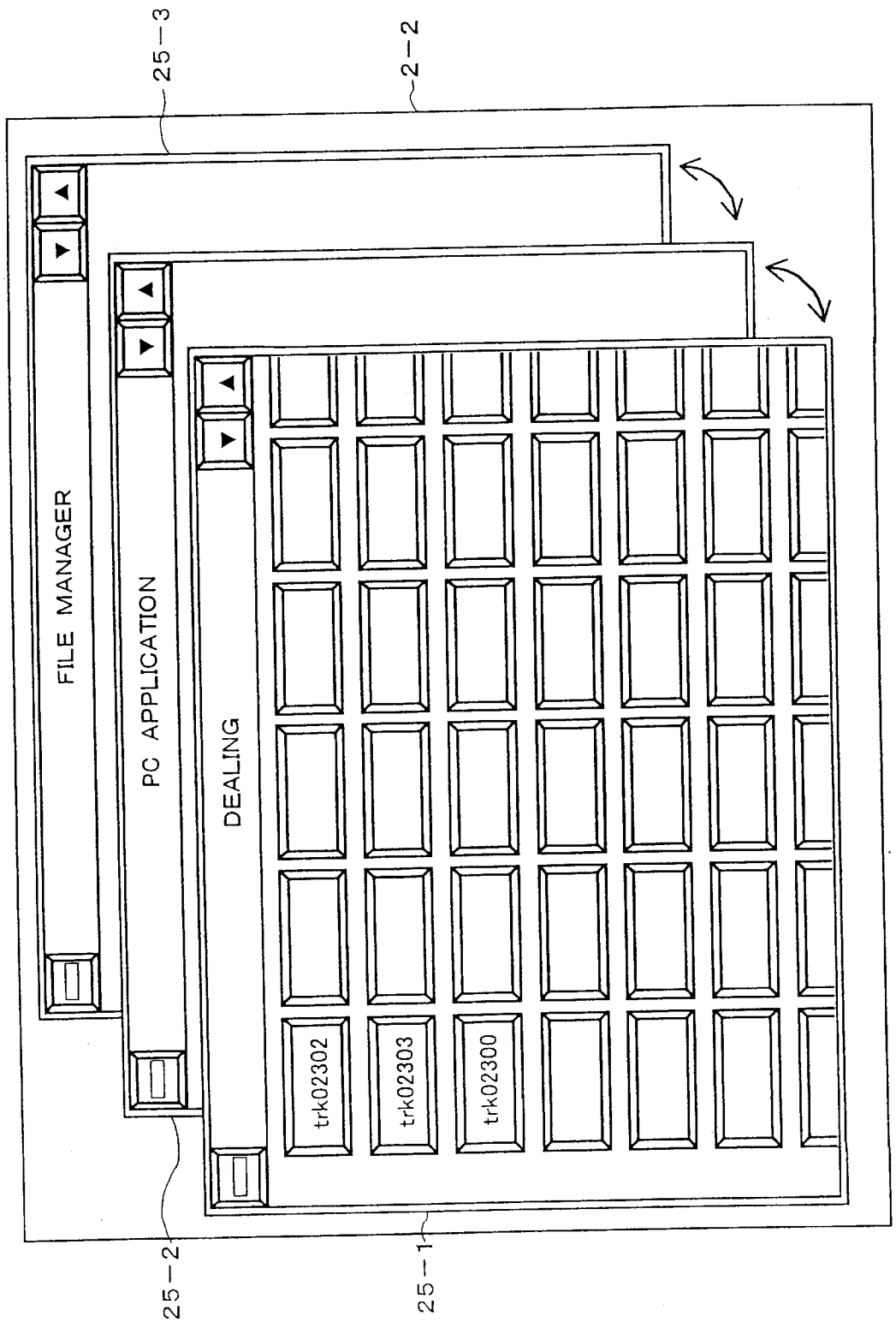
FIG. 6 is an explanatory diagram showing an example of display screens displayed on a dealing talk terminal unit shown in this embodiment.

FIG. 6 shows an example of display screens displayed on the pagination key 2-2 of the talk terminal unit 1-1.

The pagination key 2-2 shown in FIG. 6 can display a plurality of processing screens by means of what is called a multi-window function, and one of windows is made active and the talk terminal unit 1-1 performs a process related to that window. FIG. 6 shows an example in which a dealing process screen (dealing window) 25-1 to provide a telephone function according to the present invention, an application software screen of a personal computer (PC application window) 25-2 and a file management screen of a personal computer (file manager window) 25-3 are displayed.

Each window can be displayed in the maximum size to cover the whole screen, changed in display size and iconized, and since these functions are publicly known, detailed description of them is omitted.

Operations related to a dealing talk connection can be performed by displaying the dealing process screen 25-1 as described above on the pagination key 2-2 of the talk terminal unit 1-1. Screens to be displayed on the dealing process screen 25-1 include a line display screen for selecting and specifying a call originating, an incoming call answering, a call holding, a hold answering operation, an interruption and the like.

Figure 7:
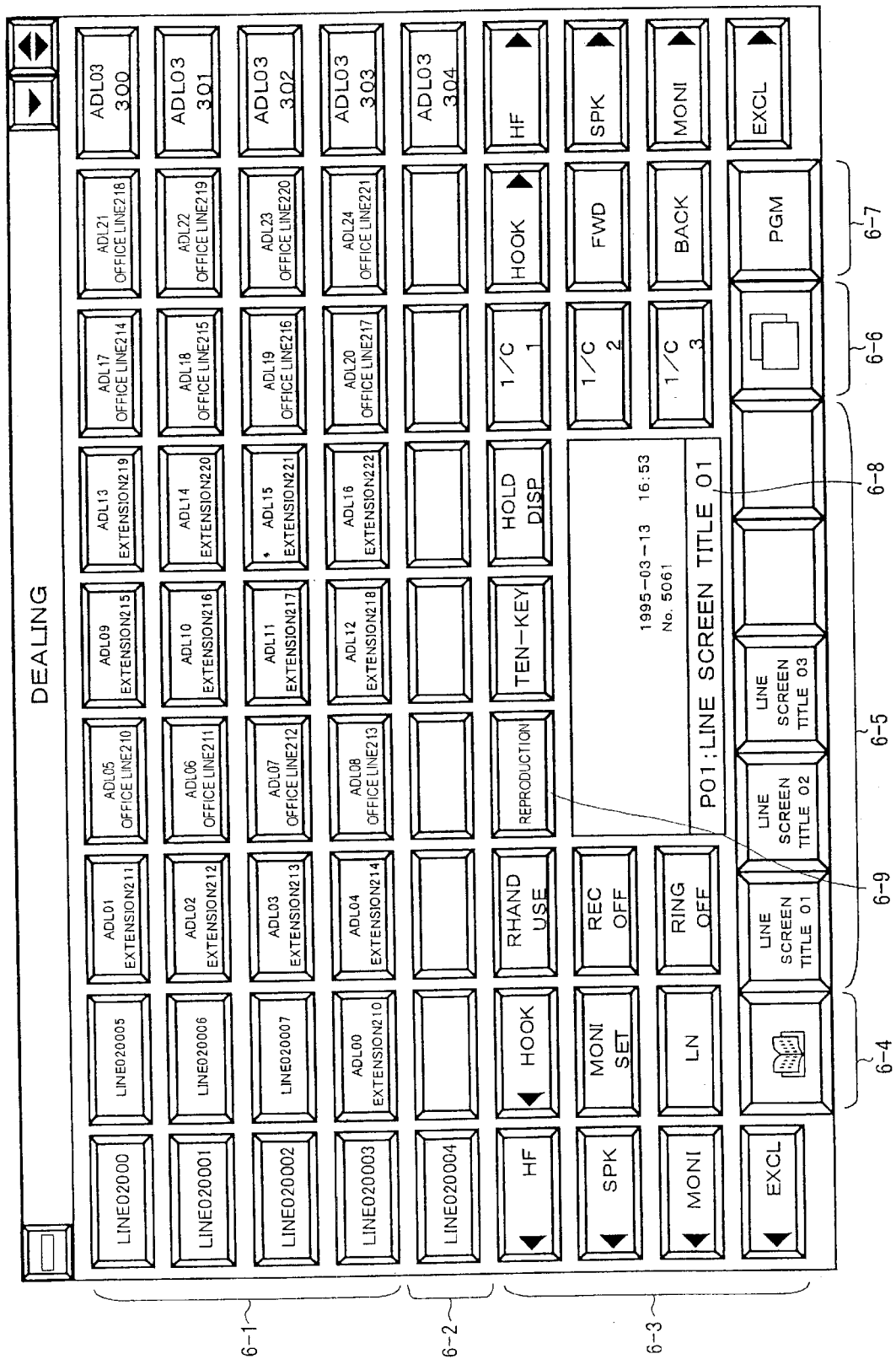
FIG. 7 is an explanatory diagram showing an example of line display screens displayed on a dealing talk terminal unit shown in this embodiment.

The line display screen is described in the following. FIG. 7 shows a line display screen displayed on the pagination key 2-2 of the talk terminal unit 1-1.

In the display screen shown in FIG. 7, a small quadrilateral button-shaped display represents a key, and 36 display keys represented by 6-1 are line keys for registering various lines, automatic dialing and the like.

Two display keys at both ends of nine display keys represented by 6-2 have the same functions as said line keys 6-1, and the other seven display keys are other page incoming call display keys which can display an incoming line on a line display screen other than the current screen page or an incoming line selected from incoming lines not registered in any page.

A group of display keys represented by 6-3 are function keys, and a display key is provided for each function. In the function keys 6-3, an "HF" key is a hand-free specifying key, an "SPK" key is a speaker talk specifying key, an "MONI" key is a monitor specifying key, a "HOOK" key is a hooking key, an "EXCL" key is a talk-interruption inhibiting key, an "MONI SET" key is a monitor speaker setting key, an "LN" key is a recall request key, an "RHAND USE" key is a right handset enabling key, a "REC OFF" key is a recording stop key, a "RING OFF" key is a ringer stop key, a "REPRODUCTION" key 6-9 is a reproduction menu key to be used in requesting reproduction of a recorded talk content, a "TEN-KEY" key is a ten-key (dial key) display request key, a "HOLD DISP" key is a hold-only screen changeover key, an "I/C1" key is an incoming-only screen 1 changeover key, an "I/C2" key is an incoming-only screen 2 changeover key, an "I/C3" key is an incoming-only screen 3 changeover key, an "FWD" key is a screen page feed key, and a "BACK" key is a screen page back key. The "HF", "SPK", "MONI" and "HOOK" keys are set corresponding to each of the left and right handsets.

And in FIG. 7, a display key represented by 6-4 is an index screen changeover key described later, a display key represented by 6-5 is a line display screen direct-changeover key, a display key represented by 6-6 is a title changeover key for changing over line display screen direct-changeover keys 6-5 themselves one after another, and a display key represented by 6-7 is a data setting screen changeover key.

And a display space represented by 6-8 is an information display portion, and this information display portion 6-8 displays the content of dialing and the destination data, name and the like, and displays the date and time, and the talk terminal unit number as illustrated in an unused state. A function of the reproduction key 6-9 is described later.

Figure 8:
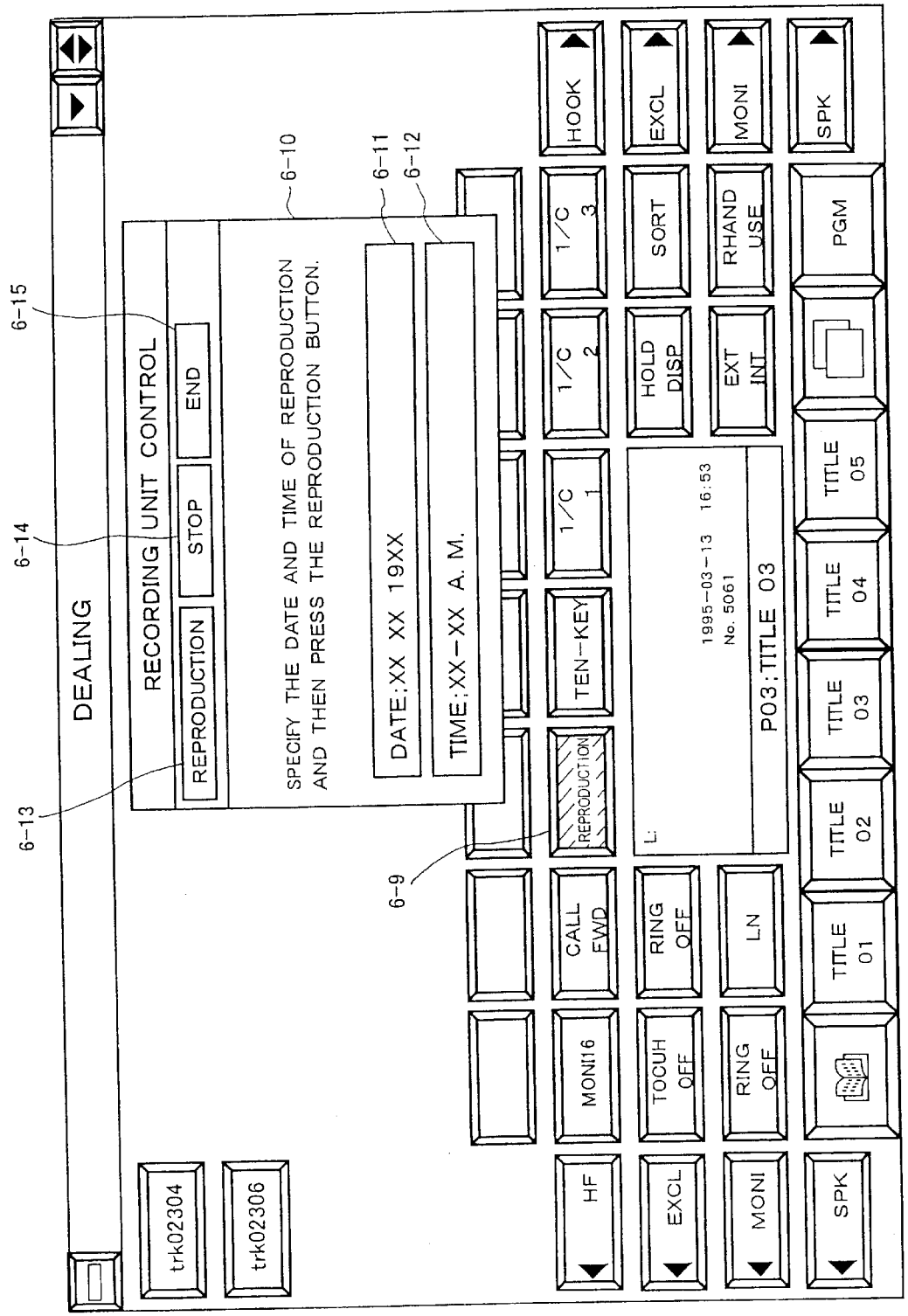
FIG. 8 is an explanatory diagram showing an example of reproduction control screens displayed at the time of reproduction of a recorded content on a dealing talk terminal unit shown in this embodiment.

FIG. 8 is an example of a reproduction control screen displayed on the pagination key 2-2 of the talk terminal unit 1-1.

A reproduction control screen 6-10 shown in FIG. 8 is a screen. displayed when performing a request of reproducing a talk content to the talk recording unit 1-29, and has a date input portion 6-11, a time input portion 6-12, a reproduction key 6-13 for reproducing a recorded talk content, a stop key 6-14 for stopping this reproduction, and an end key 6-15 for ending this reproduction control screen.

Then, operation of making the talk recording unit 1-29 record a talk content being talked through the talk terminal unit 1-1 is described.

First, in case that a dealer performs a dealing work by using a talk terminal unit 1-1, the dealer needs to talk with its customer using this talk terminal unit 1-1. Hereupon, the dealer performs a call originating operation or an incoming call answering operation, using a line key 6-1 shown in FIG. 7.

When this talk terminal unit 1-1 detects a key operation of the line key 6-1, it transmits the call connection information related to this operation through a channel D of the I interface to the line control unit 1-2.

This line control unit 1-2 connects this talk terminal unit 1-1 and the talk terminal unit of its desired customer to each other through a digital line circuit 1-3 and a trunk (PRI 1-10/COT 1-11/1.5MINF 1-12) on the basis of the received line control information.

When in such a way the talk terminal unit 1-1 comes to be in a talking state with the talk terminal unit of a desired customer, a talk content of them is outputted to a talk recording output interface portion 3-34 from the speech path control unit 3-20 of this talk terminal unit 1-1, and is recorded in a channel of the talk recording unit 1-29 corresponding to this talk terminal unit 1-1.

Figure 9:
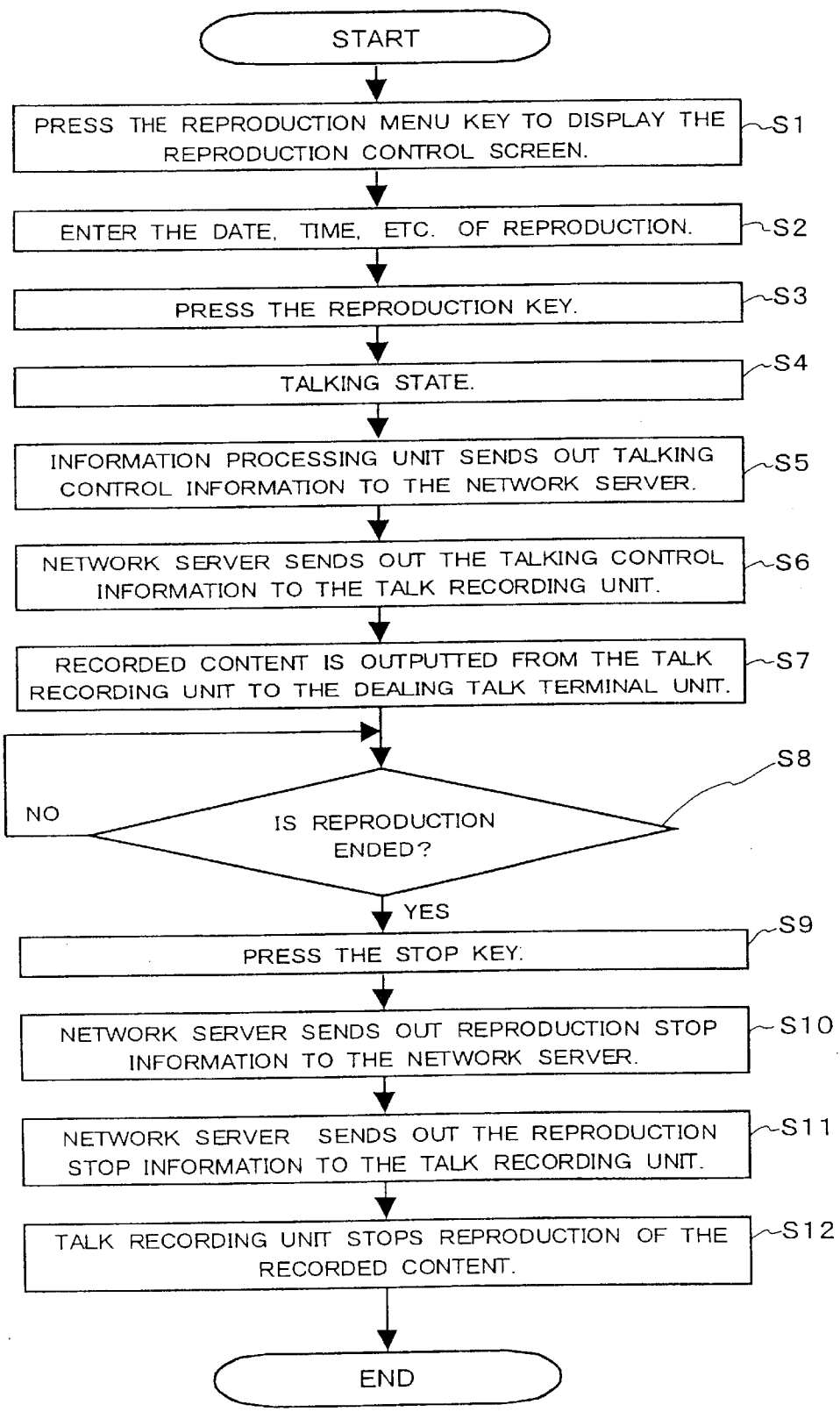
FIG. 9 is a flowchart showing a processing operation and an operation method for making a dealing talk terminal unit perform and stop reproduction of a talk content recorded in a talk recording unit in this embodiment.
Figure 10:
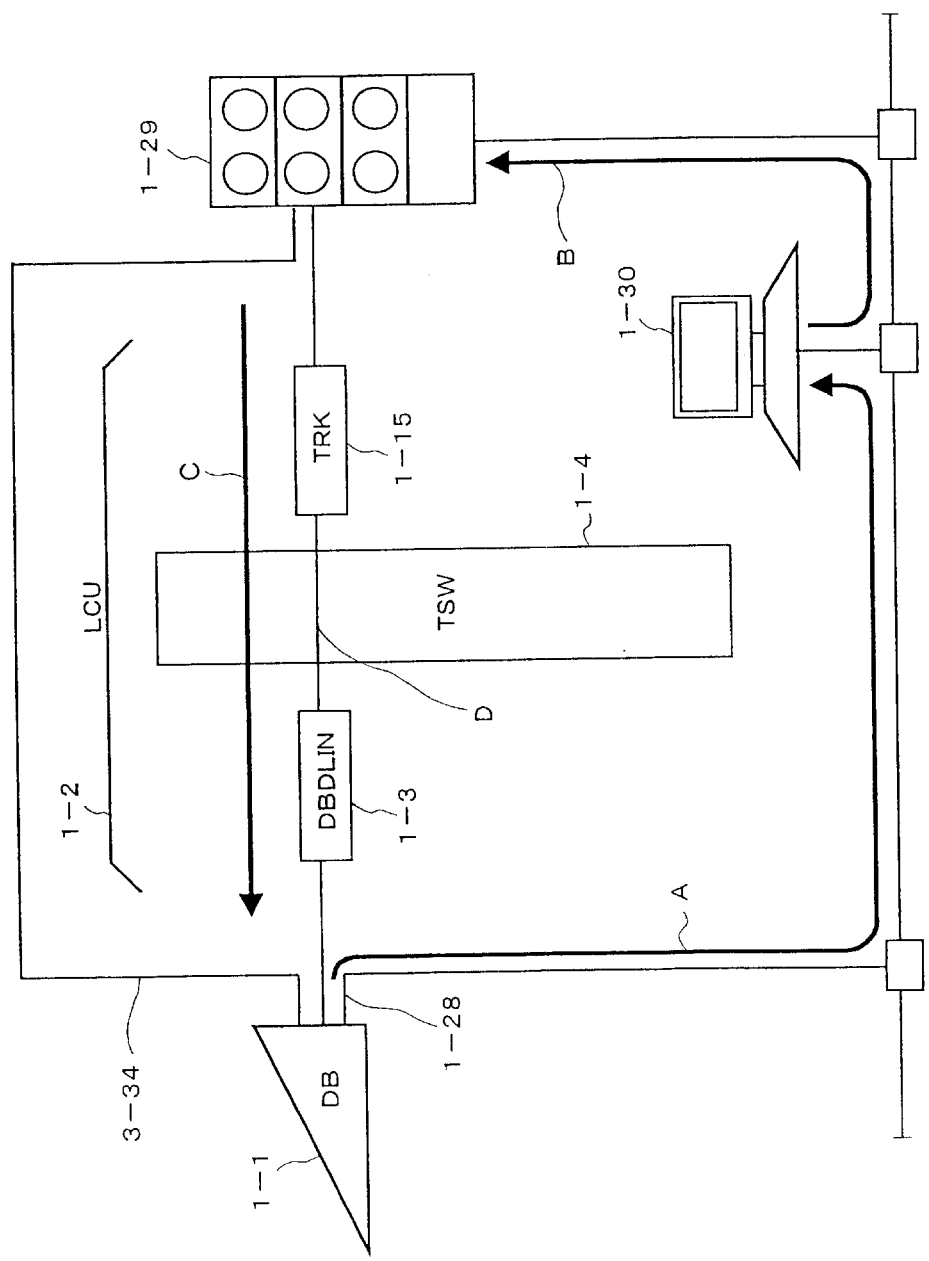
FIG. 10 is an explanatory diagram showing operation of making a dealing talk terminal unit perform and stop reproduction of a talk content recorded in a talk recording unit in this embodiment.
Figure 11:
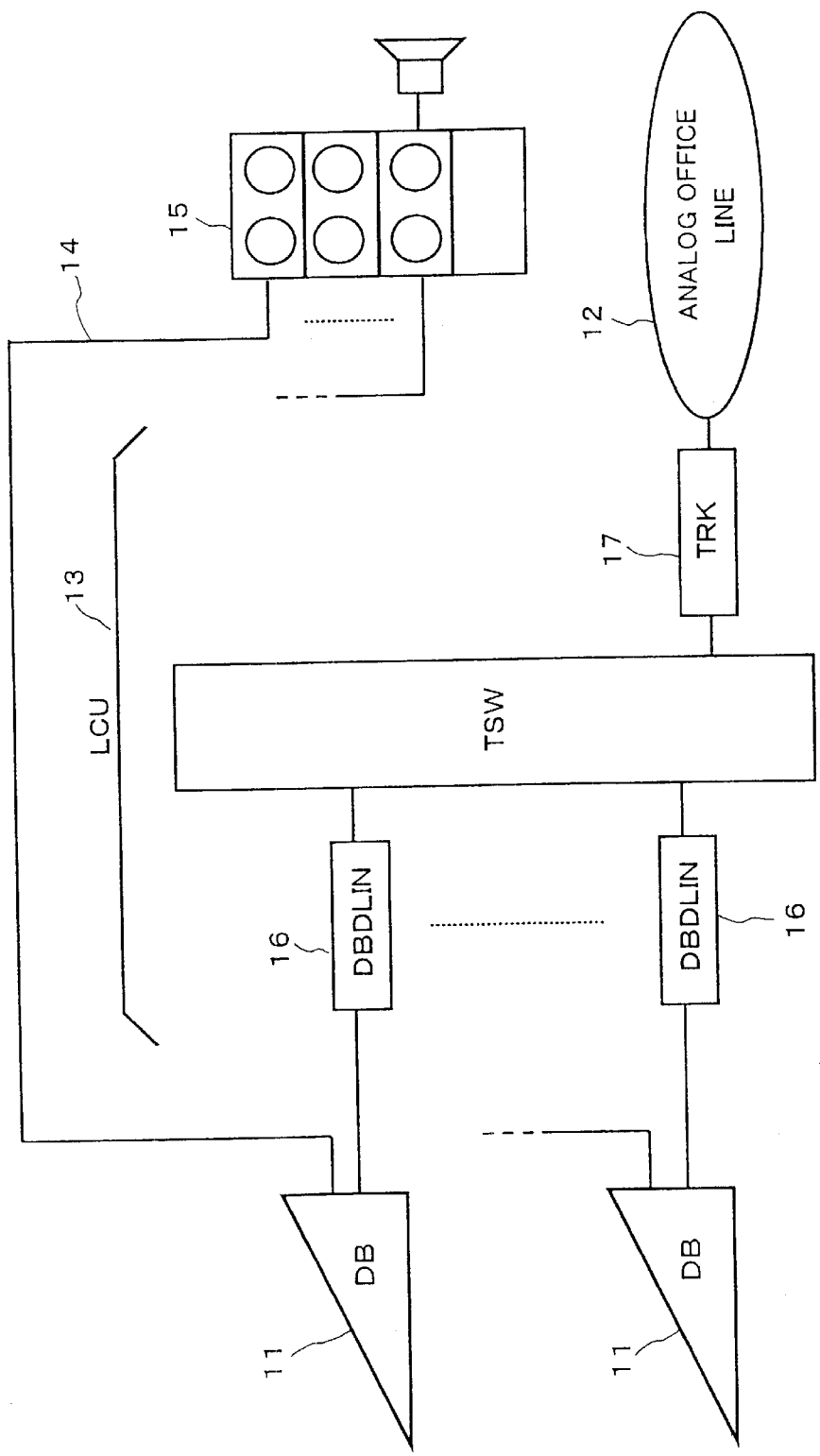
FIG. 11 is a block diagram roughly showing the composition of a recording control apparatus in a dealing talk system of the prior art.

Next, operation and action of reproduction in case that a dealer of a talk terminal unit 1-1 listens to a talk content recorded in such a way are described with reference to FIGS. 9 and 10. FIG. 9 is a flowchart showing a processing operation and an operation method for making the talk terminal unit 1-1 perform and stop reproduction of a talk content recorded in the talk recording unit 1-29, and FIG. 10 is an explanatory diagram showing action for making the talk terminal unit 1-1 perform and stop reproduction of a talk content recorded in the talk recording unit 1-29 in this embodiment.

First, in case that a general switched line (digital line for talking) of the talk terminal unit 1-1 is in a free state, a reproduction control screen 6-10 is displayed on the pagination key 2-2 as shown in FIG. 8 by a dealer's operation of pressing the reproduction key (reproduction menu key) 6-9 displayed on the pagination key 2-2 of the talk terminal unit 1-1 (step S1).

Next, the dealer inputs its desired date, time and the like of reproduction into the date input portion 6-11 and the time input portion 6-12 by means of a keyboard 1-25 connected with the information processing unit 3-29 of the talk terminal unit 1-1 (step S2), and then presses the reproduction key 6-13 (step S3).

When the line trunk controller 3-1 of this talk terminal unit 1-1 detects that the reproduction key 6-13 has been pressed down, it transmits connection request information for connecting the talk recording unit 1-29 through the channel D to the line control unit 1-2. When this line control unit 1-2 receives the connection request information, it connects a digital line circuit 1-3 and a trunk 1-15 with each other and sets a speech path between the talk recording unit 1-29 and the talk terminal unit 1-1 to bring them into a talking state as shown by symbol D in FIG. 10 (step S4).

On the other hand, following this operation, said talk terminal unit 1-1 transmits such talking control information as channel information, time information, reproduction information and the like as shown by symbol A of FIG. 10 from the LAN interface 1-28 of the information processing unit 3-29 shown in FIG. 4 being inside said talk terminal unit 1-1 through a LAN (Ethernet) to the network server 1-30 (step S5). The channel information contained in said talking control information is data for identifying a channel in a talk recording unit 1-29 corresponding to each talk terminal unit 1-1 accommodated by the line control unit 1-2 in a one-to-one correspondence.

The network server 1-30 following a process of step S5 sends out talking control information to the talk recording unit 1-29 as shown by symbol B of FIG. 10, and the talk recording unit 1-29 specifies an area to be reproduced from a talk content recorded on the basis of this talking control information (step S6).

And the recorded content reproduced by the talk recording unit 1-29 is transmitted on a general switched line and is outputted, as shown by symbol C of FIG. 10, from a speaker 2-9 or the left and right handsets 3-21 through a data transmission LSI 3-17, a codec 3-18 and a speech path control unit 3-20 of the talk terminal unit 1-1 (step S7).

The network server 1-30 controls the talk recording unit 1-29 on the basis of talking control information containing channel information from the information processing unit 3-29, and selects a channel in the talk recording unit 1-29 on the basis of this talking control information, and provides a recorded content reproduced by the talk recording unit 1-29 through a general switched line of the trunk 1-15 to the talk terminal unit 1-1.

After a process of step S7, the dealer determines whether or not this operation of reproduction is to be ended (step S8). If the dealer determines to end this operation of reproduction, it presses the stop key 6-14, the end key 6-15 or the telephone screen return key 2-8 in the reproduction control screen 6-10 shown in FIG. 8 (step S9).

When detecting that these key have been pressed down, the talk terminal unit 1-1 sends out the reproduction stop information from the LAN interface 1-28 of the information processing unit 3-29 inside it to the network server 1-30 (step S10).

The network server 1-30 receives this reproduction stop information and transmits this reproduction stop information to the talk recording unit 1-29 (step S11), and thereby the talk recording unit 1-29 stops the operation of reproducing the talk content (step S12).

And the line trunk controller 3-1 of the talking terminal unit 1-1 which has detected the key pressing operation sends out disconnection request information for disconnecting the talk recording unit 1-29 through the channel D to the line control unit 1-2. This line control unit 1-2 disconnects the speech path between the digital line circuit 1-3 and the trunk 1-15 in response to the disconnection request information so that another dealer can use this trunk 1-15.

Therefore, since in case that a dealer having a talk terminal unit 1-1 at its own seat wants to listen to a talk content recorded in a talk recording unit 1-29, this embodiment allows the dealer to listen to the talk content recorded in the talk recording unit 1-29 by means of a speaker 2-9 or the left and right handsets of the talk terminal unit 1-1 by the dealer's remote operation of the talk recording unit 1-29 from the talking terminal unit 1-1 as the dealer is at its own seat without moving to a place where the talk recording unit 1-29 is installed, it is possible to greatly improve the working efficiency of a dealer at the time of listening to a recorded content of the talk recording unit 1-29.

And since this embodiment provides in a talk recording unit 1-29 a channel to record a talk content corresponding to each talk terminal unit 1-1 in a one-to-one correspondence and makes talking control information contain channel information for identifying each channel of this talk recording unit 1-29, it is possible for a dealer to listen to a talk content of each talk terminal unit 1-1 by remote operation.

Furthermore, this embodiment has been described mainly as a dealing talk system, but this can be applied also to an ordinary private branch exchange (PBX).

UTILIZABILITY IN INDUSTRY

As described above, a recording control apparatus in a dealing talk system according to the present invention is very effective to a dealing talk system used in financial transactions where when a dealer leaves its own dealing talk terminal unit, for example, in order to listen to a talk content recorded in a talk recording unit, the working efficiency of the dealer is remarkably degraded, and the working efficiency of a dealer at the time of listening to a recorded content can be remarkably improved by utilizing this recording control apparatus.

What is claimed is:

1. A dealing talk system, comprising:

a line control unit including a plurality of trunk circuits and a plurality of line circuits and each line circuit connected to a telephone line, a plurality of dealing talk terminals connected to said plurality of line circuits, through a plurality of telephone lines a talk recording unit, connected to said plurality of trunk circuits, which records content of talks in said plurality of dealing talk terminals, and a network server that controls said talk recording unit, wherein said plurality of dealing talk terminals are directly connected to said network server by a communication line, wherein each of said plurality of dealing talk terminals includes:
  reproduction request means for inputting a request for reproduction of the content of talks recorded in said talk recording unit, and
  an information processing unit that outputs talk control information to said network server via said communication line upon input of the request for reproduction of the content of talk by said reproduction request means,
wherein said network server includes:
  command output means for, upon reception of said talk control information via said communication line, outputting a reproduction command so as to output the content of talk corresponding to the talk control information to one of said dealing talk terminals via said telephone line, and
wherein said talk recording unit includes:
  reproduction output means for, upon detection of said reproduction command from said network server, outputting the content of talk corresponding to said talk control information to one of said dealing talk terminals via said telephone line based on said reproduction command.

2. A dealing talk system according to claim 1, wherein
said talk recording unit has a channel which corresponds to one of said dealing talk terminals accommodated by said line control unit in a one-to-one correspondence and records its talk content, and
said network server controls said talk recording unit on the basis of talking control information containing channel information from said information processing unit, selects a channel in said talk recording unit on the basis of the channel information contained in the talking control information, and provides a talk content in the channel through said telephone line to one of said dealing talk terminals.

3. A dealing talk system according to claim 1, wherein each of said dealing talk terminals includes data designation means for inputting designation of date of reproduction,
wherein, when the request for reproduction of the content of talk related to reproduction time inputted by said date designation means is inputted by said reproduction request means, said information processing unit outputs the talk control information including the reproduction time to said network server via said communication line.

4. A dealing talk system according to claim 3, wherein, when said command output means receives said talk control information via said communication line, said command output means outputs the reproduction command to said recording control unit so as to output the content of talk corresponding to the reproduction time included in the talk control information to one of said dealing talk terminals via said telephone line.

5. A dealing talk system according to claim 4, wherein, when said reproduction output means detects said reproduction command from said network server, said reproduction output means outputs the content of talk corresponding to the reproduction time included in said talk control information to one of said dealing talk terminals via said telephone line based on the reproduction command.

* * * * *